(No Model.)
J. BENFIELD.
HORSESHOE.
No. 463,474.              Patented Nov. 17, 1891.
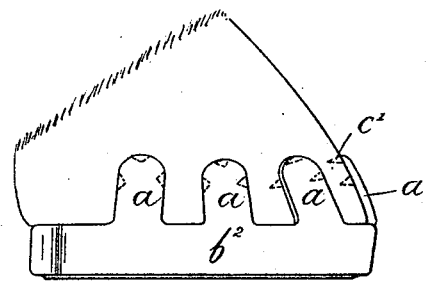
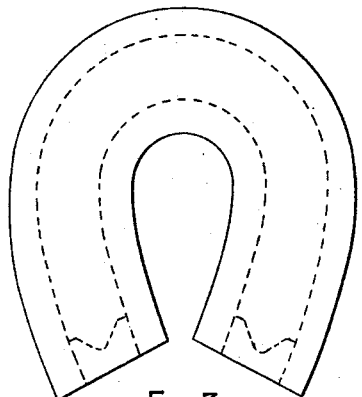
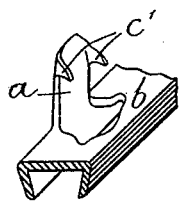
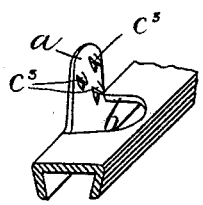
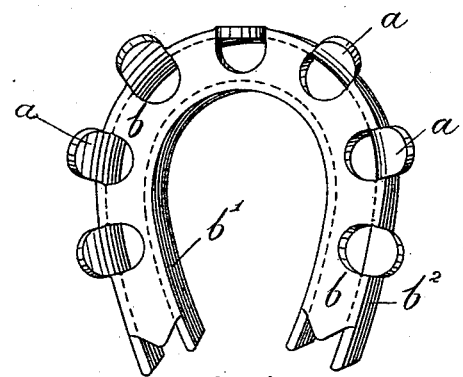
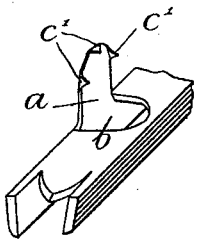
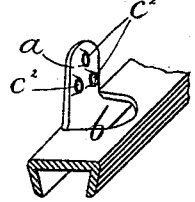
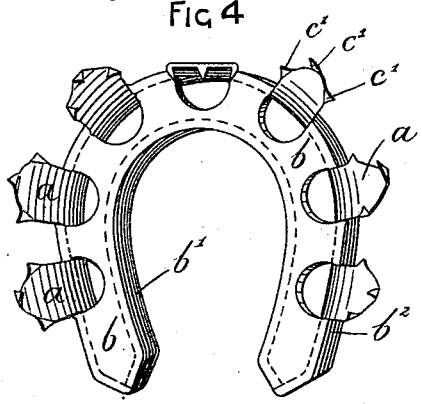
WITNESSES
Charles Bosworth Kelley
Herbert Whitehouse
INVENTOR
Joseph Benfield

UNITED STATES PATENT OFFICE.

JOSEPH BENFIELD, OF WALSALL, ENGLAND.

HORSESHOE.

SPECIFICATION forming part of Letters Patent No. 463,474, dated November 17, 1891.

Application filed January 12, 1891. Serial No. 377,433. (No model.) Patented in England February 20, 1889, No. 2,996.

*To all whom it may concern:*

Be it known that I, JOSEPH BENFIELD, a subject of Her Majesty the Queen of Great Britain, residing at Walsall, in the county of Stafford, England, have invented certain new and useful Improvements in Shoes for Horses, Mules, and other Hoofed Animals, (for which I and a certain Silas Brownhill have obtained a patent in Great Britain, No. 2,996, bearing date February 20, 1889,) of which the following is a specification.

This invention has for its object to improve those horseshoes which are fastened onto the horse's hoof by jagged clips formed round the shoes from the solid metal, the shoes being made with a tapered groove on the wearing side, in which metal, wood, leather, india-rubber, or other such like substance can be fixed.

According to this invention I make the said horseshoes from sheet metal, (preferably steel,) as herein described and illustrated by the accompanying drawings, on which—

Figure 1 illustrates in side elevation a horseshoe fixed to a horse's hoof and constructed according to this invention. Fig. 2 shows a blank for forming the said shoe when made from sheet-steel or other metal. Fig. 3 represents one stage in the manufacture of the said shoe, which is represented in its finished state by Fig. 4. Figs. 5, 6, 7, and 8 each show different methods of jagging the clips.

The same letters of reference indicate the same or corresponding parts in all the figures of the drawings.

The jagged or roughened clips, which are hammered against the horse's hoof so as to engage therewith and secure the horseshoe thereto, are marked $a$, and the body of the horseshoe is marked $b$.

In carrying out this invention I make a channel-section horseshoe $b$ either by bending into a horseshoe form a steel or other metal bar of ordinary channel-section or I employ a blank of sheet-steel or other ductile sheet metal, preferably the form represented by Fig. 2, the edges of which (by means of suitable dies worked in a press or otherwise) are bent down along the dotted lines, so as to make a channel-section shoe. I then form the necessary jagged or roughened clips $a$ for fixing the shoe to the horse's hoof by punching corresponding pieces $a$ (see Figs. 3, 4, 5, 6, 7, and 8) out of the upper side of the shoe, which pieces, however, are not detached from the shoe, but are bent up and outwardly from the sides thereof, and are then thinned out and increased in size by hammering or pressure. The clips $a$ are then jagged or roughened by any convenient means, such as by turning up sharp projecting pieces $c'$ from their edges, as shown by Figs. 4, 7, and 8, or by punching holes through them from their outside so as to leave burrs $c^2$ on their inside, as shown by Fig. 6; or projecting pegs or spikes $c^3$ can be formed from the body of the clip by punching holes therein and forcing out the parts from the holes, as shown by Fig. 5. The groove is or may be closed at the heel ends $b^3$ of the shoe, as shown by Fig. 4, by notching the ends $b^3$ and then bending round the side pieces $b'$ $b^2$ to meet.

By striking up the clips $a$ from the body of the material it will be seen that openings are left around the shoe. This construction serves to lighten the shoe, as were the projections drawn from the metal in forming the shoe the weight would be increased in proportion to the number of clips used. Further than this, the openings communicate with the channel in the shoe, and by reason of this the filling material, as rubber or leather, will spread into these openings, and thus not only cushion the hoof, but be held in place more securely.

India-rubber, wood blocks, leather, frost-cogs, studs, or toe-pieces can be fixed in the groove in the under side of the shoe, as in other grooved horseshoes.

In conclusion, I wish it to be understood that I make no exclusive claim to the employment of clips with horseshoes for securing the same to the hoof, nor do I make any exclusive claim to a horseshoe having a groove or recess or recesses on its under side, as I am aware that horseshoes embodying these features have been made prior to my invention hereof; but What I do desire to claim is—

1. A horseshoe formed with a channel in its under side, a cushion or filling material in said channel, said shoe having a series of openings around its upper side communicating with the channel, and the clips extending from the edges of said openings, substantially as described.

2. The horseshoe described, consisting of a plate of sheet metal bent to form a channel with sides $b'$ $b^2$, said shoe having a top piece with a series of openings therein and an angular end and with clips extending from the edges of the opening, the said sides $b'$ $b^2$ being bent about the angular ends of the top piece, substantially as described.

In testimony whereof I have signed in the presence of two subscribing witnesses.

JOSEPH BENFIELD.

Witnesses:
CHARLES BOSWORTH KELLEY,
HERBERT WHITEHOUSE.